(12) United States Patent
Onagi

(10) Patent No.: US 7,885,149 B2
(45) Date of Patent: Feb. 8, 2011

(54) DISK CARRIER DEVICE AND DISK DRIVE

(75) Inventor: Nobuaki Onagi, Kanagawa (JP)

(73) Assignees: Ricoh Company, Ltd., Tokyo (JP);
Chotaro Engineering Co., Sakado-shi, Saitama (JP)

( * ) Notice: Subject to any disclaimer, the term of this patent is extended or adjusted under 35 U.S.C. 154(b) by 669 days.

(21) Appl. No.: 11/872,438

(22) Filed: Oct. 15, 2007

(65) Prior Publication Data

US 2008/0092152 A1   Apr. 17, 2008

(30) Foreign Application Priority Data

Oct. 17, 2006   (JP)   ............... 2006-283028

(51) Int. Cl.
*G11B 19/20* (2006.01)
(52) U.S. Cl. .................................. 369/30.85
(58) Field of Classification Search ........................ None
See application file for complete search history.

(56) References Cited

U.S. PATENT DOCUMENTS

| 4,754,445 | A | * | 6/1988 | Young et al. | 369/30.86 |
| 5,541,897 | A | * | 7/1996 | Baca et al. | 369/30.92 |
| 5,729,524 | A | * | 3/1998 | Pines et al. | 369/30.64 |
| 5,734,629 | A | * | 3/1998 | Lee et al. | 369/30.34 |
| 5,934,865 | A | * | 8/1999 | Meadows | 414/796.9 |
| 6,321,649 | B1 | * | 11/2001 | Vangen et al. | 101/35 |
| 6,490,232 | B2 | * | 12/2002 | Sato | 369/30.34 |
| 6,548,137 | B2 | | 4/2003 | Ito et al. | |
| 6,760,052 | B2 | * | 7/2004 | Cummins et al. | 347/171 |
| 6,790,592 | B2 | | 9/2004 | Harigaya et al. | |
| 6,795,970 | B2 | * | 9/2004 | Wada et al. | 720/659 |
| 6,841,049 | B2 | | 1/2005 | Ito et al. | |
| 6,884,487 | B2 | | 4/2005 | Ito et al. | |
| 7,127,725 | B2 | * | 10/2006 | Lee | 720/600 |
| 7,164,629 | B2 | | 1/2007 | Aman et al. | |
| 7,194,750 | B2 | | 3/2007 | Aman et al. | |
| 2002/0186636 | A1 | | 12/2002 | Onagi et al. | |
| 2003/0002400 | A1 | * | 1/2003 | Klein | 369/30.55 |
| 2005/0024996 | A1 | * | 2/2005 | Schumacher | 369/30.33 |

FOREIGN PATENT DOCUMENTS

| JP | 1-165945 U | 11/1989 |
| JP | 7-296480 A | 11/1995 |
| JP | 10-308059 | 11/1998 |
| JP | 2003-115108 | 4/2003 |
| JP | 2007-4906 | 1/2007 |

* cited by examiner

*Primary Examiner*—Mark Blouin
(74) *Attorney, Agent, or Firm*—Dickstein Shapiro LLP

(57) ABSTRACT

A disk carrier device for carrying an optical disk having a plate in the center, which plate is capable of being attracted by a magnetic force, is disclosed. The disclosed disk carrier device includes an attracting unit including a permanent magnet that attracts and thereby holds the plate; and a holding mechanism configured to detachably hold the attracting unit.

8 Claims, 15 Drawing Sheets

DISK CARRIER DEVICE AND DISK DRIVE

BACKGROUND OF THE INVENTION

1. Field of the Invention

The present invention generally relates to a disk carrier device and a disk drive. More particularly, this invention relates to a disk carrier device for carrying an optical disk and a disk drive including the disk carrier device.

2. Description of the Related Art

In recent years, digitization of information has accelerated as seen in the start of digital TV broadcasting and this trend has increased the demand for an optical disk with higher capacity or the demand for recording information at higher density on an optical disk. One way to meet such a demand is to reduce the spot diameter of a laser beam used to record or reproduce information on an optical disk.

The spot diameter of a laser beam can be reduced by using a laser beam with a shorter wavelength or by increasing the numerical aperture (NA) of an objective lens. However, reducing the wavelength of a laser beam or increasing an NA reduces the depth of focus of an optical system including an objective lens and therefore makes it necessary to improve the accuracy of a focus servo. Also, increasing an NA results in a reduced distance between an objective lens and a recording surface of an optical disk and therefore makes it necessary to reduce the out-of-plane motion (deviation of the surface of an optical disk from a plane, or movement of an optical disk in the direction of its rotational axis) of an optical disk, for example, to prevent an optical pickup including an objective lens from contacting the optical disk.

Under the above circumstances, optical disks (may also be called flexible optical disks) made of flexible thin-film sheets with recording surfaces are being developed, and an optical disk drive that rotates a flexible optical disk on a stabilizing plate and thereby effectively reduces the out-of-plane motion of a flexible optical disk has been proposed (see, for example, patent documents 1 and 2). Since the substrate of a flexible optical disk is a fragile thin-film sheet, a rigid hub made of, for example, a metal is normally provided in the center of a flexible optical disk. When a flexible optical disk is taken out of a disk cartridge and mounted on a disk drive, the flexible optical disk is held on a disk carrier device by, for example, attracting its hub with an electromagnet.

However, to hold a flexible optical disk using an electromagnet, it is necessary to continuously supply an exciting current to excite the electromagnet while carrying a flexible optical disk. This increases the electric power needed and the amount of heat generated when carrying a flexible optical disk. Meanwhile, multiple flexible optical disks may be stacked in a disk cartridge to implement a compact, high-capacity data storage. In such a case, it is preferable to make the hub of a flexible optical disk as thin as possible. However, making a hub thinner makes it necessary to increase an exciting current.

[Patent document 1] Japanese Patent Application Publication No. 10-308059

[Patent document 2] Japanese Patent Application Publication No. 2003-115108

SUMMARY OF THE INVENTION

Embodiments of the present invention provide a disk carrier device and a disk drive that solve or reduce one or more problems caused by the limitations and disadvantages of the related art.

An embodiment of the present invention provides a disk carrier device for carrying an optical disk having a plate in the center thereof, which plate is capable of being attracted by a magnetic force. The disk carrier device comprises an attracting unit including a permanent magnet that attracts and thereby holds the plate; and a holding mechanism configured to detachably hold the attracting unit.

Another embodiment of the present invention provides a disk carrier device for carrying an optical disk having a plate in the center thereof, which plate is capable of being attracted by a magnetic force. The disk carrier device comprises a position-determining part configured to determine a position of the plate; an attracting unit including a permanent magnet that attracts and holds the plate via a part of the position-determining part; and a drive mechanism configured to move the attracting unit back and forth between a position where the attracting unit does not exert the magnetic force on the plate and a position where the attracting unit exerts the magnetic force on the plate.

Still another embodiment of the present invention provides a disk drive that comprises a disk cartridge configured to house an optical disk having a plate capable of being attracted by a magnetic force; a disk mechanism configured to rotate the optical disk and to record or reproduce information on the optical disk being rotated; and a disk carrier device of an embodiment of the present invention configured to carry the optical disk between the disk cartridge and the disk mechanism.

DESCRIPTION OF THE PREFERRED EMBODIMENTS

Preferred embodiments of the present invention are described below with reference to the accompanying drawings.

Figure 1:
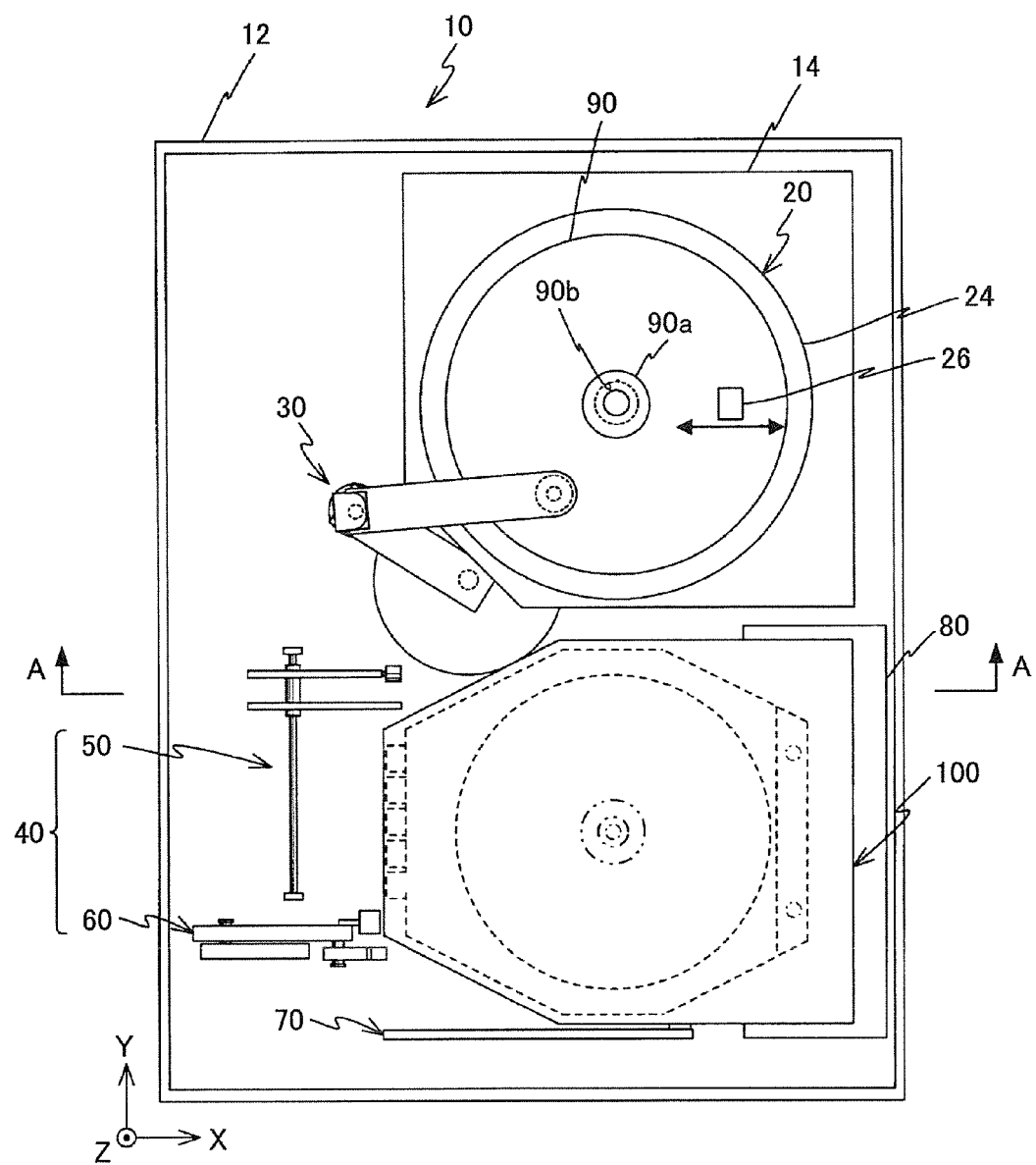
FIG. 1 is a schematic diagram of an optical disk drive 10 according to an embodiment of the present invention.

An embodiment of the present invention is descried below with reference to FIGS. 1 through 15C. FIG. 1 is a schematic diagram of an optical disk drive 10 according to an embodiment of the present invention.

As shown in FIG. 1, the optical disk drive 10 includes a disk rotating device 20 for rotating an optical disk 90, an optical pickup 26 for irradiating the optical disk 90 with a laser beam, a disk carrier device 30 for carrying the optical disk 90 between a disk cartridge 100 and the disk rotating device 20, an opening/closing device 70 for opening/closing the disk cartridge 100, a disk selecting system 40 for selecting a specified one of optical disks 90 in the disk cartridge 100, and a housing 12 for housing the above components. The disk rotating device 20 and the optical pickup 26 may be collectively called a disk mechanism. The disk rotating device 20, the disk carrier device 30, the opening/closing device 70, and the disk selecting system 40 are controlled by a control device 11 (see FIG. 12) in an integrated manner.

Figure 2:
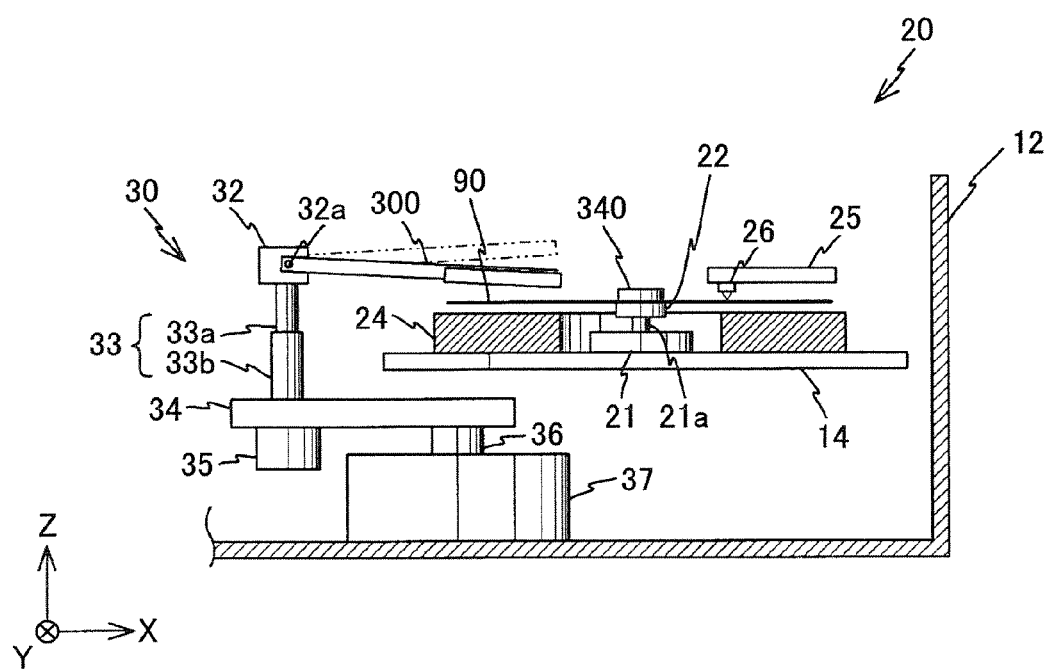
FIG. 2 is a cross-sectional view of a disk rotating device 20 and a disk carrier device 30 of the optical disk drive 10 taken along line A-A shown in FIG. 1.

In FIG. 1, the disk rotating device 20 is disposed in the +Y side of the housing 12 and fixed by a supporting part (not shown). FIG. 2 is a cross-sectional view of the disk rotating device 20 and the disk carrier device 30 of the optical disk drive 10 taken along line A-A shown in FIG. 1. As shown in FIG. 2, the disk rotating device 20 includes a support plate 14 held horizontally by a supporting part (not shown) at a position some distance above the inner bottom surface of the housing 12; a motor 21 fixed on the upper surface of the support plate 14; a disk chuck 22 on which the optical disk 90 is to be mounted; and a stabilizing plate 24 disposed below the optical disk 90 mounted on the disk chuck 22 and fixed on the upper surface of the support plate 14.

The optical disk 90 is a flexible optical disk that comprises, for example, a thin sheet made of polyethylene terephthalate (PET) having a thickness of about 0.1 mm, a recording layer formed on the upper surface (+Z surface in FIG. 1) of the thin sheet, and a transparent protective film with a thickness of about 5 μm formed on the recording layer. As shown in FIG. 1, a circular opening 90b having a diameter of, for example, 10 mm is formed in the center of the optical disk 90. Also, a circular plate (disk hub) 90a made of a magnetic material such as a ferritic stainless steel and having a thickness of, for example, about 0.1 mm is affixed onto the upper surface (+Z surface) of the thin sheet made of PET. The disk hub 90a and the opening 90b are arranged substantially concentrically. The disk hub 90a has an external diameter that is larger than the diameter of the opening 90b. A circular opening having a diameter (for example, about 5 mm) smaller than that of the opening 90b is formed in the center of the disk hub 90a.

The disk chuck 22 has a columnar shape with a circular recess in its top surface and comprises a metal material such as iron that is capable of being attracted by a magnet.

The motor 21 rotates the disk chuck 22 via a rotational shaft 21a and thereby causes the optical disk 90 to rotate, for example, at a rotational speed of about 5000 rpm. The rotation of the optical disk 90 is controlled by the control device 11 (see FIG. 12).

The stabilizing plate 24 has a circular shape in plan view and has a circular opening in its center. The stabilizing plate is fixed on the support plate 14 and positioned such that the motor 21 comes approximately in the center of the circular opening. When the optical disk 90 is rotated, the rotation produces a centrifugal force and the centrifugal force causes a restoring force that tries to make the optical disk 90 flat. On the other hand, the rotation and the surface shape of the optical disk 90 cause a difference in airflow, the difference in airflow causes a change in pressure, and the change in pressure causes a repulsive force. The stabilizing plate 24 balances the restoring force and the repulsive force and thereby reduces the out-of-plane motion of the optical disk 90 in the direction of its rotational axis.

The optical pickup 26 is disposed above (in the +Z direction) the optical disk 90 and comprises a light source, an optical system including an objective lens, and a light-receiving element. The optical pickup 26 writes (records), reads (reproduces), and erases information on the optical disk 90 by focusing a light beam on a recording surface of the optical disk 90 being rotated by the disk rotating device 20 and by receiving light reflected from the recording surface. The optical pickup 26 is moved in the radial direction of the optical disk 90 by a pickup driving device 25 including a seek motor (not shown).

The disk carrier device 30 is disposed approximately in the center of the housing 12 as shown in FIG. 1. As shown in FIG. 2, the disk carrier device 30 includes a motor 37 fixed on the inner bottom surface of the housing 12, a first swing arm 34 the lower surface near one end of which is fixed to a rotational shaft 36 of the motor 37, a drive unit 35 attached to the lower surface near the other end of the first swing arm 34, a shaft 33 connected to the drive unit 35, a joint mechanism 32 connected to the shaft 33, and a second swing arm 300 connected via a shaft 32a to the joint mechanism 32.

The motor 37 is implemented by, for example, a stepping motor that rotates the rotational shaft 36 disposed parallel to the Z axis. Rotational displacement of the motor 37 is detected by a sensor (not shown) that supplies a detection signal to the control device 11 (see FIG. 12).

The first swing arm 34 is made of a plate having a rectangular shape in plan view and is caused by the motor 37 to swing around the rotational shaft 36.

The shaft 33 includes a cylindrical fixed part 33b fixed on the upper surface of the first swing arm 34 and a columnar movable part 33a inserted into the fixed part 33b. The movable part 33a is rotated with respect to the fixed part 33b and moved up and down (in the Z axis direction) at a specified stroke by the drive unit 35. The rotational direction and the position in the vertical direction of the movable part 33a are detected by a sensor (not shown) that supplies a detection signal to the control device 11 (see FIG. 12).

The −X end of the second swing arm 300 is connected to the joint mechanism 32, which is fixed to the upper end of the movable part 33a of the shaft 33, so as to be able to turn around the shaft 32a. The joint mechanism 32 allows the second swing arm 300 to turn around the shaft 32a between positions indicated by a solid line and a hypothetical line (dashed double-dotted line) in FIG. 2. An exemplary configuration of the second swing arm 300 is described below in more detail with reference to FIGS. 3 and 4.

Figure 3:
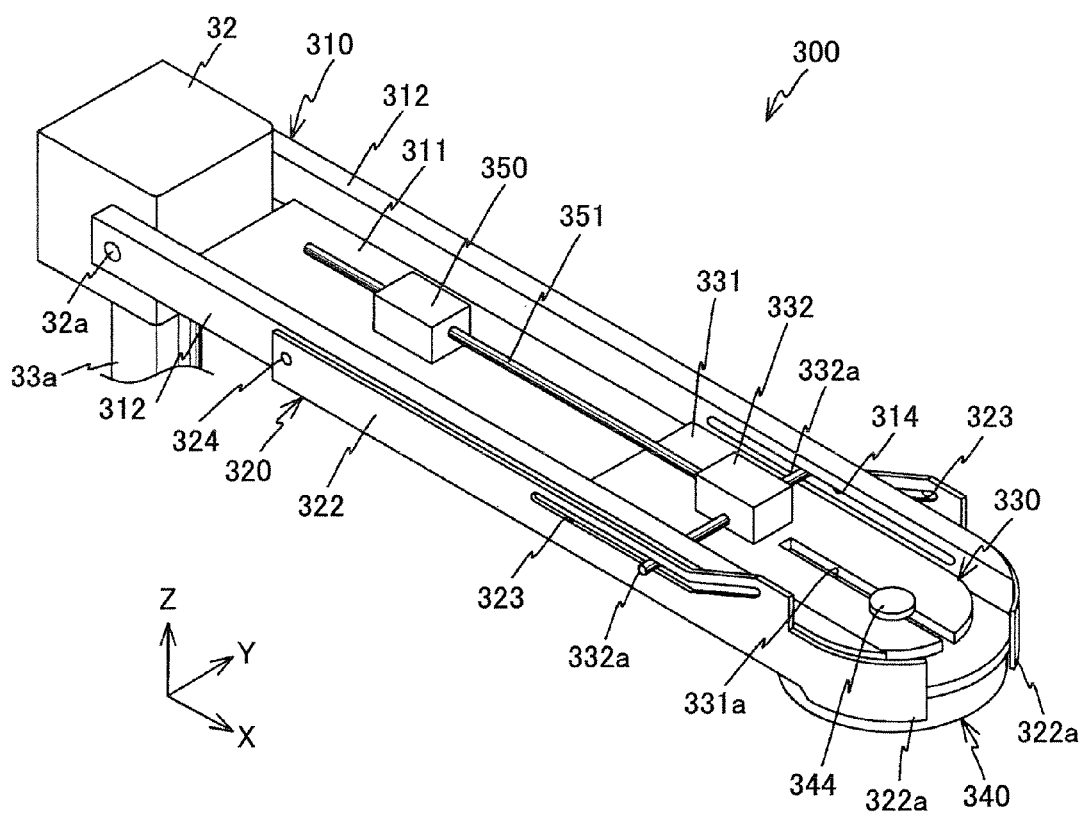
FIG. 3 is a perspective view of a second swing arm 300.

FIG. 3 is a perspective view of the second swing arm 300 connected to the joint mechanism 32. As shown in FIG. 3, the second swing arm 300 includes an arm body 310 the −X end of which is connected by the shaft 32a to the joint mechanism 32 so as to be able to turn around an axis parallel to the Y axis; a separating part (separating mechanism) 320 attached to the arm body 310 so as to be able to turn up and down (in the Z axis direction); a holding part 330 slidably provided on the upper surface of the arm body 310; a clamper (attracting unit) 340 detachably held by the holding part 330, and a drive mechanism 350 that slides the holding part 330 via a drive shaft 351 extending in the X axis direction (the holding part 330 and the drive mechanism 350 may be collectively called a holding mechanism).

Figure 4:
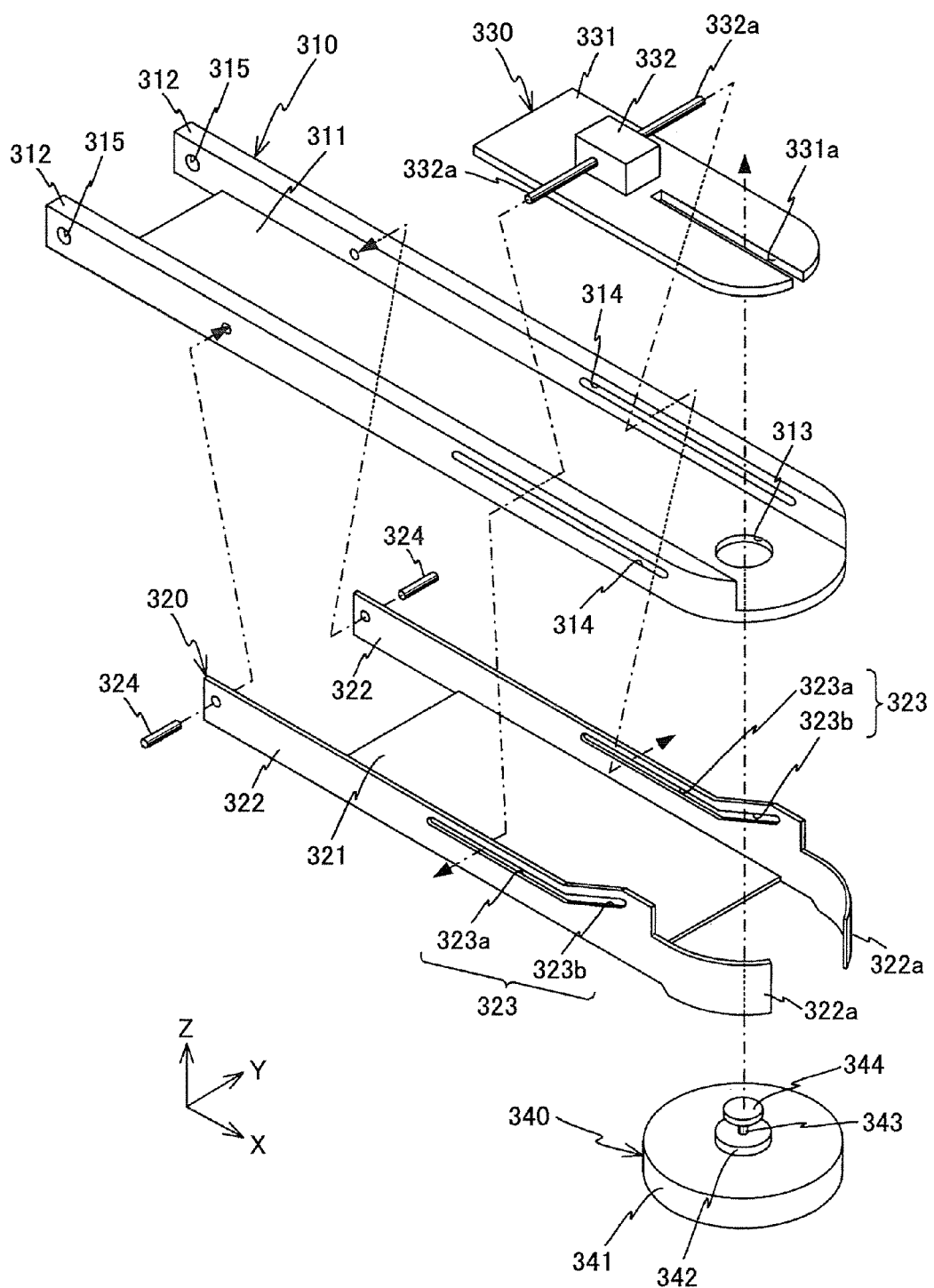
FIG. 4 is an exploded perspective view of the second swing arm 300.

FIG. 4 is an exploded perspective view of the second swing arm 300. The arm body 310 is made of, for example, a plastic and includes, as shown in FIG. 4, a base 311 extending in the X axis direction and a pair of frames 312 formed along the +Y and −Y edges of the base 311. The base 311 has a round hole 313 near the +X end, and the +X end of the base 311 has a circular arc shape that is concentric with the round hole 313. Each of the frames 312 has an elongated guide hole 314 extending in the X axis direction from the +X end to the central portion and a round hole 315 near the −X end. The shaft 32a is inserted into the round holes 315 to connect the second swing arm 300 to the joint mechanism 32.

The separating part 320 is formed, for example, by processing a non-magnetic sheet metal such as a copper sheet, and includes a pair of turning parts 322 extending in the X axis direction and a joining part 321 that joins the turning parts 322. A separating arm 322a is formed at the +X end of each of the turning parts 322. The separating arm 322a curves along the +X edge of the base 311 of the arm body 310 and protrudes in the +X direction. Each of the turning parts 322 also has an elongated sliding hole 323 in the central portion. The sliding hole 323 is composed of a first sliding hole 323a extending in the X axis direction and a second sliding hole 323b extending from the first sliding hole 323a at a certain angle with respect to the X axis.

The holding part 330 includes a sliding plate (engaging part) 331 the +X end of which has a shape similar to that of the +X end of the base 311, and a support part 332 fixed on the upper central portion of the sliding plate 331. The sliding plate 331 is made of, for example, a ferritic stainless steel that is capable of being attracted by a magnet. The sliding plate 331 has a slit 331a extending in the X axis direction from the +X end to the center. The support part 332 fixed on the upper surface of the sliding plate 331 has a pair of sliding shafts 332a extending, respectively, in the +Y and −Y directions.

The clamper (attracting unit) 340 includes an attracting part 341 shaped like a circular plate and including a permanent magnet that attracts by magnetic force the disk hub 90a affixed onto the optical disk 90, a circular protrusion 342 in the center of the upper surface of the attracting part 341, and a hook 344 connected to the protrusion 342 via a connecting shaft 343. Also, although not shown in FIG. 4, a columnar protrusion 345 protruding downward is formed in the center of the lower surface of the attracting part 341 (see FIG. 6A).

As shown in FIG. 4, the −X ends of the turning parts 322 of the separating part 320 are connected by a pair of rotational shafts 324 to the frames 312 of the arm body 310 at positions slightly closer to the −X ends than the centers of the frames 312. In other words, the separating part 320 is disposed below the arm body 310 and attached to the arm body 310 so as to be able to turn up and down on an axis that is parallel to the Y axis. The sliding shafts 332a of the holding part 330 are inserted into the guide holes 314 of the frames 312 of the arm body 310 and the sliding holes 323 of the turning parts 322 of the separating part 320. Accordingly, the sliding plate 331 is disposed on the base 311 of the arm body 310. Thus, as shown in FIG. 3, the arm body 310, the separating part 320, and the holding part 330 are combined to form the second swing arm 300.

The drive mechanism 350 is fixed on the upper surface of the base 311 of the arm body 310 and configured to move the drive shaft 351, the +X end of which is fixed to the support part 332 of the holding part 330, in the +X and −X directions and thereby to slide the holding part 330 relative to the arm body 310 in the X axis direction.

Figure 5:
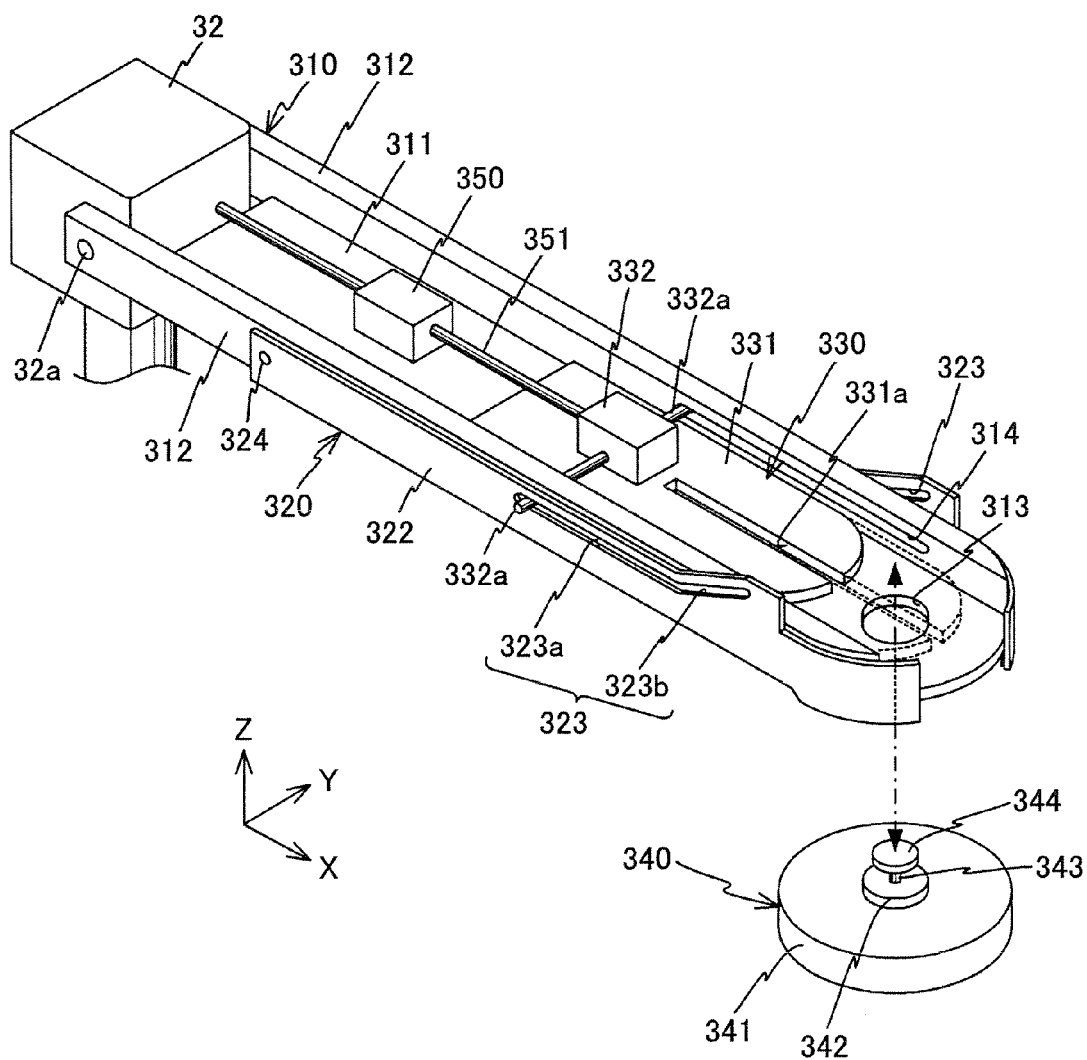
FIG. 5 is a drawing used to describe an operation of the second swing arm 300.

With the above configuration, when the holding part 330 is slid from a position indicated by a dotted line to a position indicated by a solid line as shown in FIG. 5, it becomes possible to pass the hook 344 of the clamper 340 without interference through the round hole 313 formed in the base 311 of the arm body 310 and to fit the protrusion 342 into the round hole 313. Since the height of the protrusion 342 from the upper surface of the attracting part 341 is substantially the same as the thickness of the base 311, the upper end of the protrusion 342 does not stick out from the upper surface of the base 311 when it is fitted into the round hole 313. When the holding part 330 is slid from a position indicated by the dotted line to a position indicated by the solid line, the sliding shafts 332a of the holding part 330 slide in the first sliding holes 323a of the separating part 320. Therefore, in this case, the separating part 320 does not turn with respect to the arm body 310

When the holding part 330 is slid from the position indicated by the solid line to the position indicated by the dotted line shown in FIG. 5 with the protrusion 342 of the clamper 340 fitted into the round hole 313 of the arm body 310, the connecting shaft 343 of the clamper 340 is inserted into the slit 331a formed in the sliding plate 331 of the holding part 330. As a result, as shown in FIG. 3, the hook 344 of the clamper 340 is held by the sliding plate 331 from below. Also, in this state, the magnetic force of the attracting part 341 of the clamper 340 acts on the sliding plate 331. With the protrusion 342 fitted into the round hole 313 of the arm body 310, the position of the clamper 340 in the XY plane is determined. Also, with the hook 344 held by the sliding plate 331 and the sliding plate 331 attracted by the magnetic force of the attracting part 341, the position of the clamper 340 in the Z axis direction is determined.

Figure 6A:
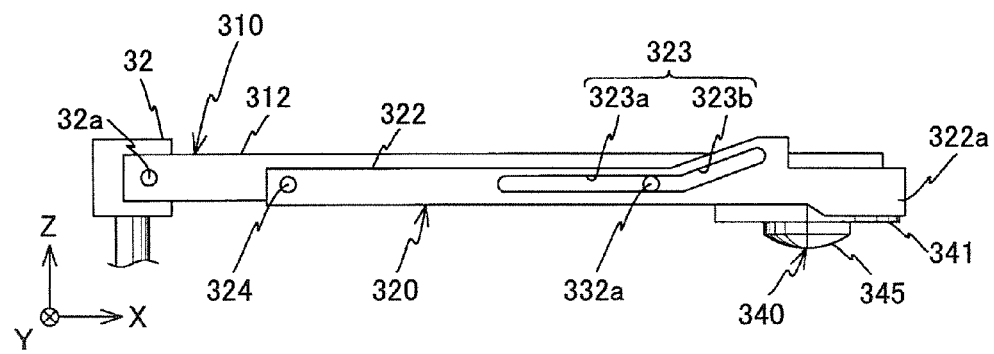
FIGS. 6A and 6B are drawings used to describe an operation of the second swing arm 300.
Figure 6B:
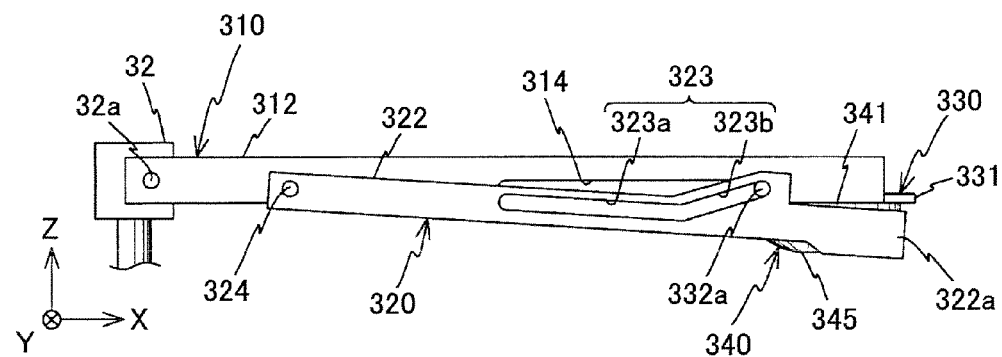

FIG. 6A is a side view of the second swing arm 300 with the holding part 330 placed in the position indicated by the dotted line shown in FIG. 5. In FIG. 6A, the lower edges of the separating arms 322a of the separating part 320 are positioned higher than the lower edge of the attracting part 341 of the clamper 340. When the holding part 330 is slid further in the +X direction, the sliding shafts 332a of the holding part 330 move, as shown in FIG. 6B, in the +X direction along the second sliding holes 323b of the sliding holes 323 formed in the separating part 320. As a result, the separating part 320 turns down (in the −Z direction) on the shafts 324 and the lower edges of the separating arms 322a of the separating part 320 become lower than the lower edges of the attracting part 341 of the clamper 340. Meanwhile, in the state shown in FIG. 6B, the +X end of the sliding plate 331 protrudes from the +X end of the arm body 310 in the +X direction. However, since the separating part 320 turns along with the movement of the sliding plate 331, the sliding plate 331 and the separating plate 320 do not interfere with each other. Also, when the sliding shafts 332a move along the second sliding holes 323b, the sliding plate 331 moves with respect to the connecting shaft 343 of the clamper 340. However, since the connecting shaft 343 of the clamper 340 can move along the slit 331a, the clamper 340 and the sliding plate 331 do not interfere with each other.

Figure 7:
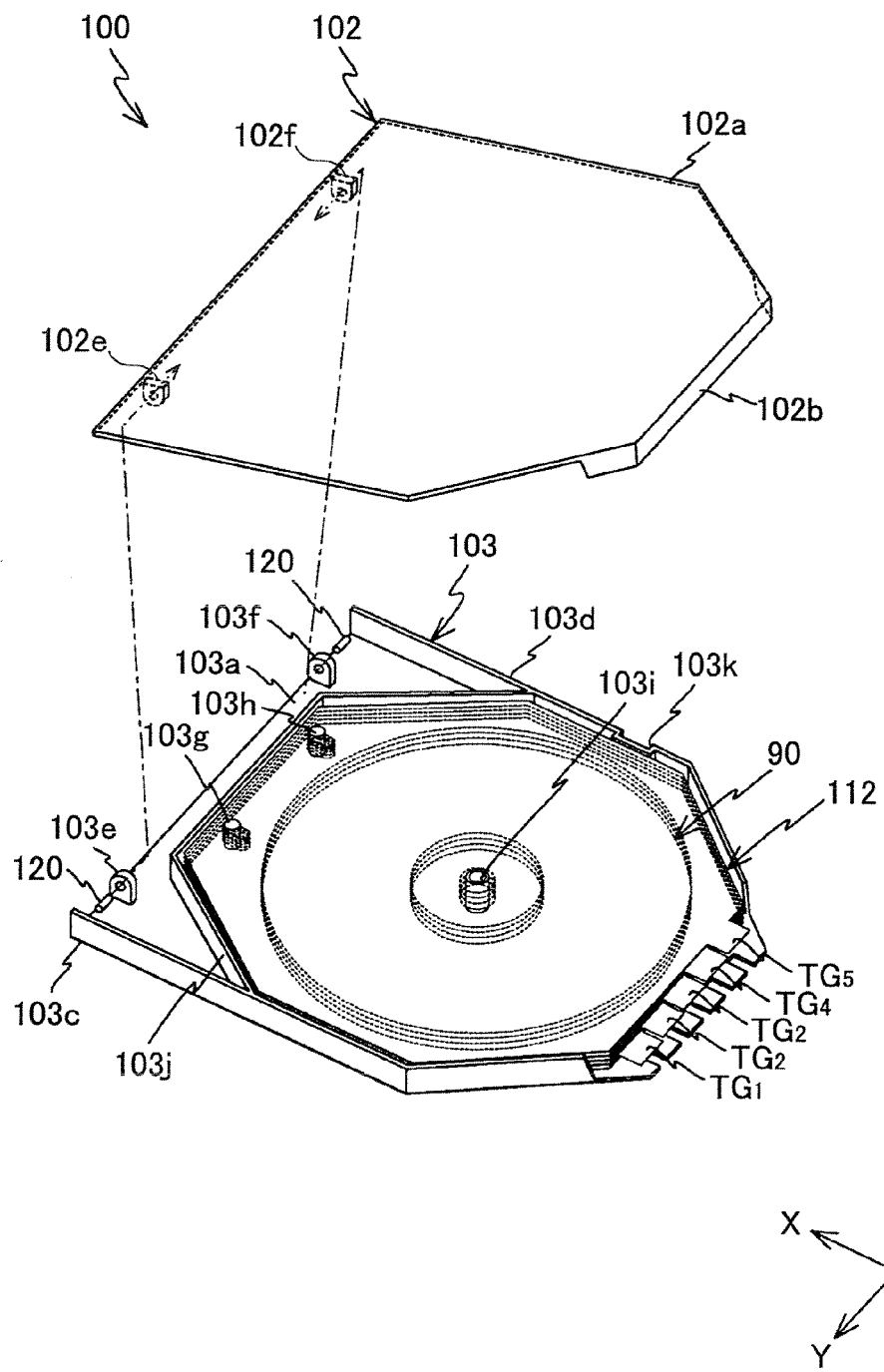
FIG. 7 is an exploded perspective view of a disk cartridge 100.

The disk cartridge 100 is detachably held by a holding device 80 on the −Y side of the disk rotating device 20 as shown in FIG. 1. As shown in FIG. 7, the disk cartridge 100 includes a base 103, a lid 102, and a holder 112 mounted on the base 103.

The base 103 includes a base plate 103a having a hexagonal shape in plan view (more precisely, a shape formed by removing two adjacent corners of a rectangle) and side walls 103c and 103d formed, respectively, along the +Y and −Y edges of the base plate 103a.

A cylindrical protrusion 103i is formed in the center of the base plate 103a. The protrusion 103i has a diameter of about 3 mm that is smaller than the inner diameter (for example, about 5 mm) of the circular opening in the disk hub 90a of the optical disk 90. A pair of columnar protrusions 103g and 103h are arranged at a distance from each other along and near the +X edge of the base plate 103a. On the opposite edge (−X edge) of the base plate 103a, as shown in an enlarged view of FIG. 8, rectangular slits S1 through S5 are formed at substantially regular intervals along the Y axis. Also on the upper surface of the base plate 103a, as shown in FIG. 7, a side wall 103j is formed on the +X side of the protrusions 103g and 103h. The side wall 103j is substantially symmetrical to the three edges of the −X side of the base plate 103a and forms an approximately octagonal shape when seen from above together with the edges of the base plate 103a.

A portion approximately in the center of the side wall 103d is bent so as to protrude inward (in the +Y direction) and thereby to form a recess 103k. The +X end of the side wall 103d is in line with the +X edge of the base plate 103a, but the −X end of the side wall 103d is short of the −X edge of the base plate 103a. The side wall 103c is symmetrical to the side wall 103d except that no recess is formed in the side wall 103c.

The lid 102 includes a lid plate 102a having substantially the same shape as that of the base plate 103a and a side wall 102b formed on the lower surface (−Z surface) along a part of edges of the −X side of the lid plate 102a.

The lid plate 102a of the lid 102 is connected to the base 103 by a hinge and is able to turn on an axis parallel to the +X edge of the base 103. Thus, the lid 102 is configured to be able to be opened and closed. The hinge includes a pair of tongue-shaped connecting parts 102e and 102f having round holes and arranged at a distance from each other along and near the +X edge on the lower surface of the lid plate 102a; a pair of tongue-shaped connecting parts 103e and 103f similar to the connecting parts 102e and 102f and formed on the base plate 103a at positions corresponding to the connecting parts 102e and 102f; and a pair of pins 120 that join, respectively, the connecting parts 102e and 103e and the connecting parts 102f and 103f.

When the lid 102 is closed, the side wall 102b fits into a space between the side walls 103c and 103d and thereby forms, together with the side walls 103c and 103d, a continuous side wall surrounding the periphery excluding the +X edge of the base plate 103a.

Figure 9:
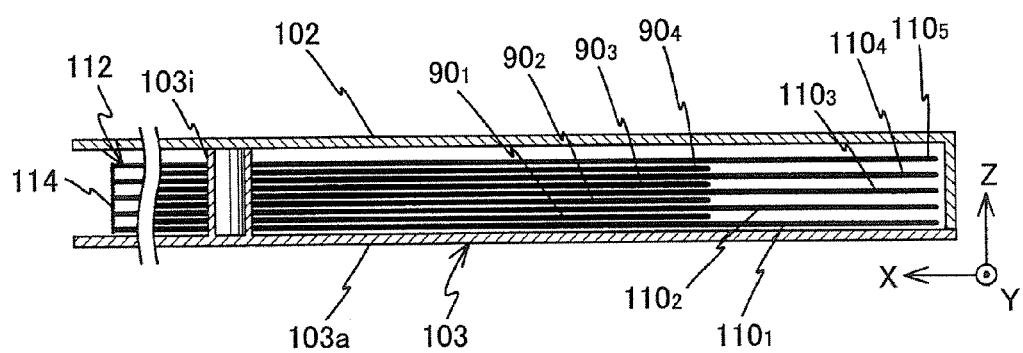
FIG. 9 is a cut-away side view of the disk cartridge 100.

The holder 112, as shown in FIGS. 7 and 9, has an octagonal shape and includes vertically-stacked sheets 110i (i=1 to n) made of polyethylene terephthalate (PET). Here, for descriptive purposes, it is assumed that n=5. As shown in FIG. 9, +X edges of the sheets $110_1$ through $100_5$ are connected by a flexible connecting part 114. Accordingly, each of the sheets $110_1$ through $100_5$ can be swung open/close around the +X edge.

Each of the sheets $110_1$ through $100_5$ of the holder 112 has a pair of elongated holes extending in the X axis direction and arranged near the +X edge along the Y axis at a distance from each other. The sheets $110_1$ through $100_5$ are placed, as shown in FIG. 7, in an octagonal area formed by the side walls 103c, 103d, and 103j with the protrusions 103g and 103h inserted into the elongated holes. Four optical disks $90_1$, $90_2$, $90_3$, and $90_4$ are held, respectively, between the pairs of sheets $110_1$ and $110_2$; $110_2$ and $110_3$; $110_3$ and $110_4$; and $110_4$ and $110_5$ of the holder 112 as shown in FIG. 9.

Figure 8:
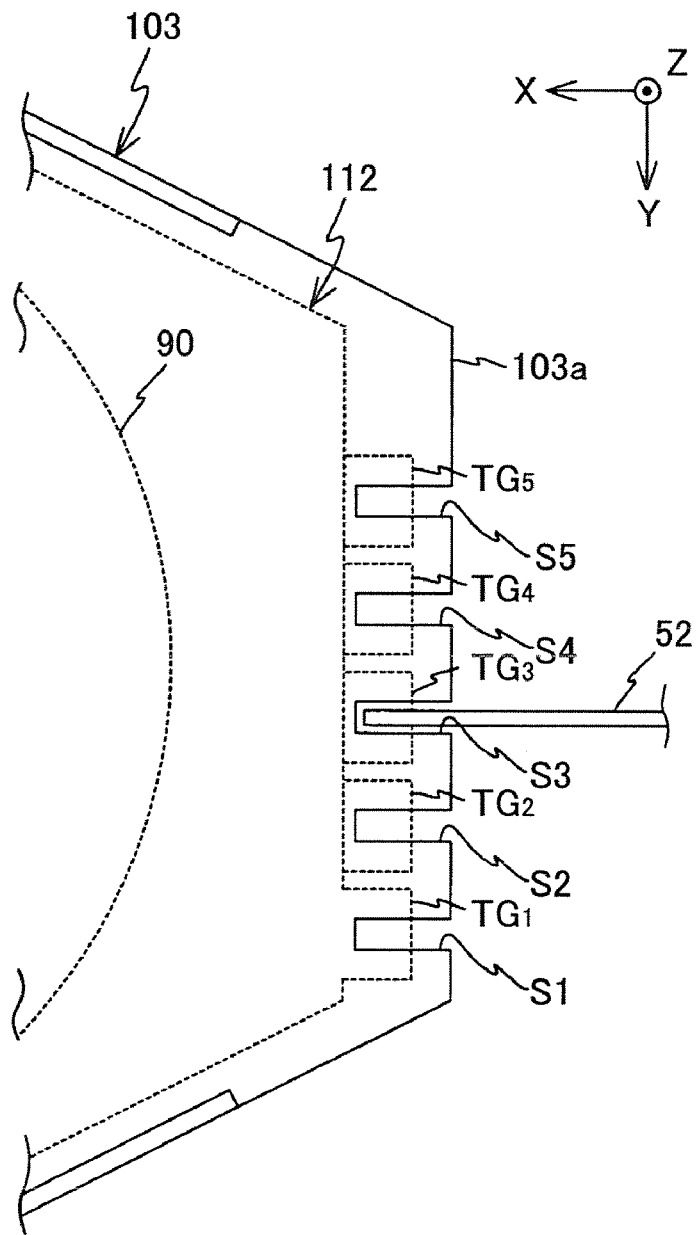
FIG. 8 is a drawing illustrating slits S1 through S5 of the disk cartridge 100.

Referring back to FIG. 7, the sheets $110_1$, $110_2$, $110_3$, $110_4$, and $110_5$, respectively, have tags $TG_1$, $TG_2$, $TG_3$, $TG_4$, and $TG_5$ at the −X edges. The tags $TG_1$, $TG_2$, $TG_3$, $TG_4$, and $TG_5$ are arranged so as not to overlap each other. As shown in FIG. 8, the positions in the XY plane of the tags $TG_1$, $TG_2$, $TG_3$, $TG_4$, and $TG_5$ correspond to the positions of the slits S1, S2, S3, S4, and S5 formed in the base plate 103a.

The disk selecting system 40, as shown in FIG. 1, is disposed on the −X side of the disk cartridge 100 and includes a holder opening/closing device 50 and a clamping device 60.

Figure 10:
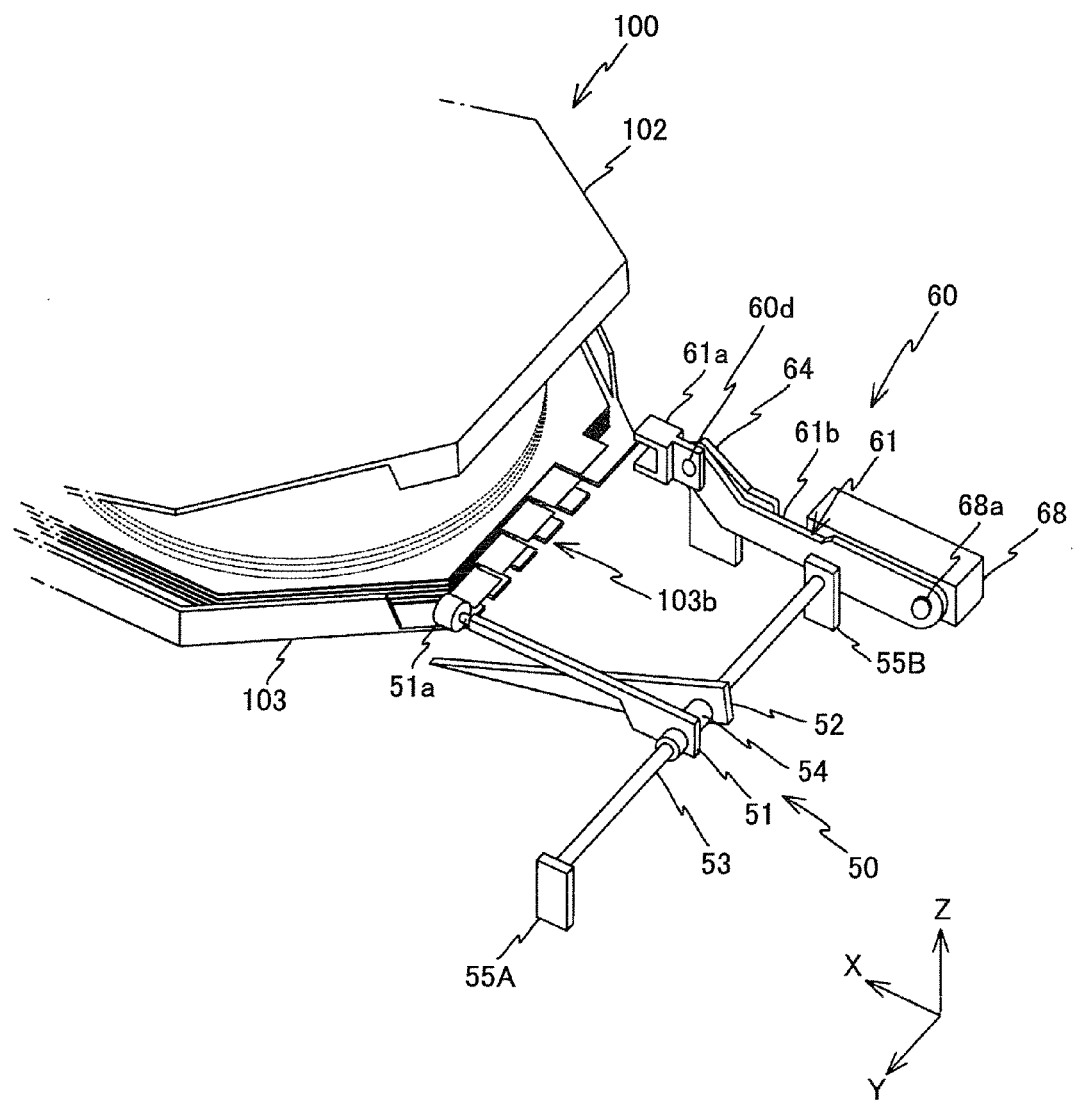
FIG. 10 is a perspective view of a holder opening/closing device 50 and a clamping device 60.

Referring to FIG. 10, the holder opening/closing device 50 includes a pair of support parts 55A and 55B fixed by other support parts (not shown) on the inner bottom surface of the housing 12 and arranged in the Y axis direction at a distance from each other; a guide rod 53 having a circular cross-sectional shape and rotatably supported at its longitudinal ends (+Y and −Y ends) by the support parts 55A and 55B such that the guide rod 53 is positioned at substantially the same height as that of the base plate 103a; a slider 54 screwed on the guide rod 53; and first and second arms 51 and 52 that are turnably attached to the outer surface of the slider 54.

When the guide rod 53 is rotated with respect to the support parts 55A and 55B by a drive unit (not shown) controlled by the control device 11, the slider 54 moves in the Y axis direction. An external thread formed on the guide rod 53 and an internal thread formed on the internal surface of the slider 54 constitute a feed screw mechanism.

The first arm 51 extends in the X axis direction and its −X end is turnably attached to the slider 54. A roller 51a is rotatably attached to the +X end of the first arm 51.

Referring to FIGS. 8 and 10, the second arm 52 is made of a wedge-shaped plate having a thickness smaller than the width in the Y axis direction of each of the slits S1 through S5 formed in the base 103 of the disk cartridge 100. The second arm 52 is disposed on the −Y side of the first arm 51 and its −X end is turnably connected to the slider 54. The distance in the Y axis direction between the first and second arms 51 and 52 is substantially the same as the pitch between the tags $TG_1$, $TG_2$, $TG_3$, $TG_4$, and $TG_5$. The second arm 52 is turned on the slider 54 by a drive mechanism (not shown) controlled by the control device 11.

Referring to FIG. 10, the clamping device 60 includes a clamp arm 61, a clamp arm drive mechanism 68 for driving the clamp arm 61, and a guide plate 64.

The clamp arm 61 includes a clamp part 61a with a pair of opposing faces and having a U-shape in side view, and an arm part 61b extending substantially in the X axis direction. The clamp part 61a is connected to the +X end of the arm part 61b such that the opposing faces become parallel to the XY plane and is turnable on a shaft 60d that is parallel to the Y axis. The arm part 61b has a round hole near its −X end. Also, as shown in FIG. 11, the arm part 61b has a columnar protrusion 61c protruding in the −Y direction.

Referring back to FIG. 10, the guide plate 64 is fixed by a support part (not shown) on the inner bottom surface of the housing 12. The guide plate 64, as shown in FIG. 11, has a V-shaped guide hole 64a into which the protrusion 61c of the arm part 61b is inserted.

The clamp arm drive mechanism 68 includes a drive lever 68a protruding in the +Y direction and inserted into the round hole of the arm part 61b, and a motor (not shown) for driving the drive lever 68a in the X axis direction.

Figure 11:
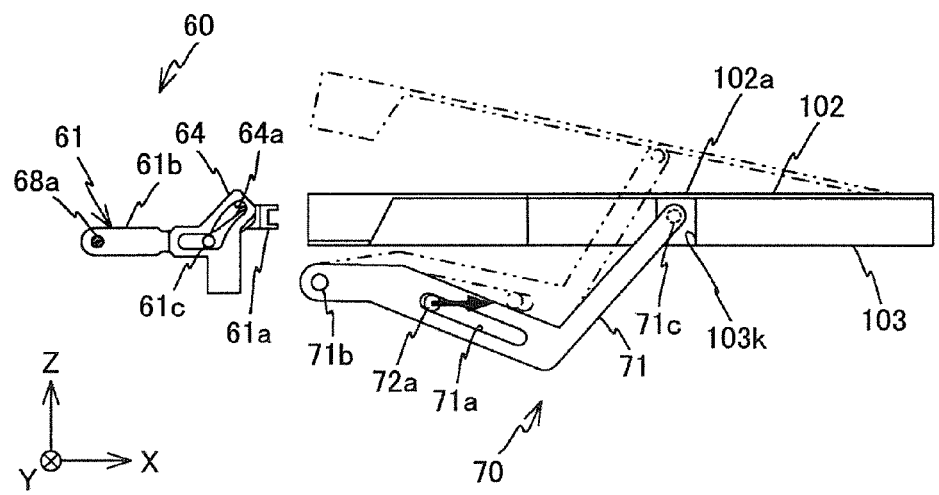
FIG. 11 is a drawing illustrating an opening/closing device 70.

Referring to FIG. 11, when the drive lever 68a is moved in the +X or −X direction by the clamp arm drive mechanism 68 under the control of the control device 11, the clamp arm 61 moves in the corresponding direction.

Referring back to FIG. 1, the opening/closing device 70 is disposed on the −Y side of the disk cartridge 100. The opening/closing device 70 includes, as shown in FIG. 11, a substantially V-shaped opening/closing arm 71 and a drive lever 72a connected to a drive mechanism (not shown).

A columnar locking part 71c is formed on the +Y surface near the +X end of the opening/closing arm 71, and an elongated hole is formed substantially in the center of the opening/closing arm 71. The opening/closing arm 71 is fixed at the −X end by a support part (not shown) on the housing 12 so as to be able to turn on a shaft 71b that is parallel to the Y axis.

The control device 11 causes a drive unit (not shown) to move the lever 72a in the +X direction and thereby turns the opening/closing arm 71. As the opening/closing arm 71 turns, the locking part 71c moves in the recess 103k, which is formed in the side wall 103d of the base 103 of the disk cartridge 100, and touches the lower surface of the lid 102. When the lever 72a is moved further in the +X direction, the lid 102 is opened or raised above the base 103 as shown by a dotted line in FIG. 11. When the lever 72a is moved in the −X direction, the lid 102 is closed.

Figure 12:
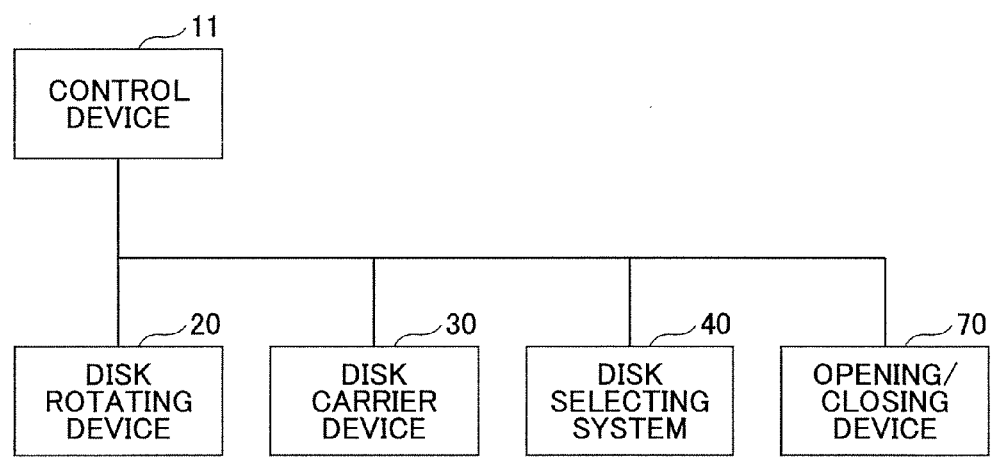
FIG. 12 is a block diagram illustrating a control system of the optical disk drive 10 shown in FIG. 1.

FIG. 12 is a block diagram illustrating a control system of the optical disk drive 10. The control device 11 is, for example, implemented by a microcomputer (or a workstation) including a central processing unit (CPU), a read-only memory (ROM), and a random-access memory (RAM). The ROM stores programs for controlling the components of the optical disk drive 10. The CPU controls the components according to the programs stored in the ROM and thereby controls the entire optical disk drive 10.

An exemplary process of carrying the optical disk 90 between the disk cartridge 100 and the disk rotating device 20 in the optical disk drive 10 is described below with reference to FIGS. 13A through 15C.

The descriptions below are based on an assumption that the optical disks $90_1$, $90_2$, $90_3$, and $90_4$ are housed, as shown in FIG. 9, in the disk cartridge 100 held by the holding device 80, and none of the optical disks $90_1$, $90_2$, $90_3$, and $90_4$ is mounted on the disk rotating device 20. Also, it is assumed that the clamper 340 is being held by the second swing arm 300 as shown in FIG. 3. In the exemplary process described below, the optical disk $90_2$ held between the sheets $110_2$ and $110_3$ as shown in FIG. 9 is taken out of the disk cartridge 100 and carried to the disk rotating device 20.

Figure 13A:
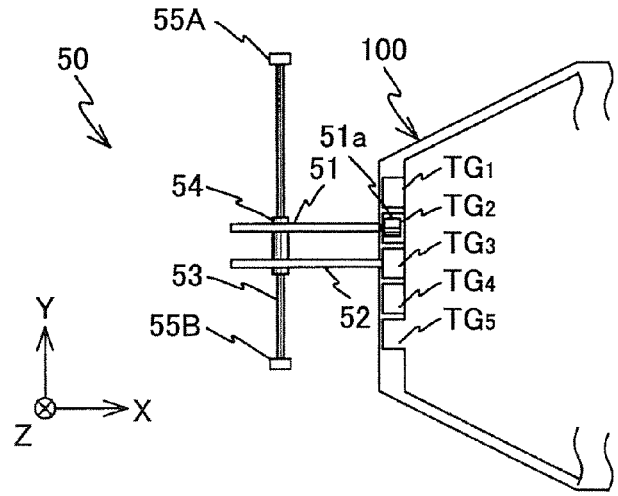
FIGS. 13A through 13C are drawings used to describe a process of opening and closing the disk cartridge 100.

First, the control device 11 causes the opening/closing device 70 to open the lid 102 of the disk cartridge 100 and moves the slider 54 as shown in FIG. 13A so that the roller 51a of the first arm 51 is positioned above the tag $TG_2$ and the tip of the second arm 52 is positioned below the tag $TG_3$.

Figure 13B:
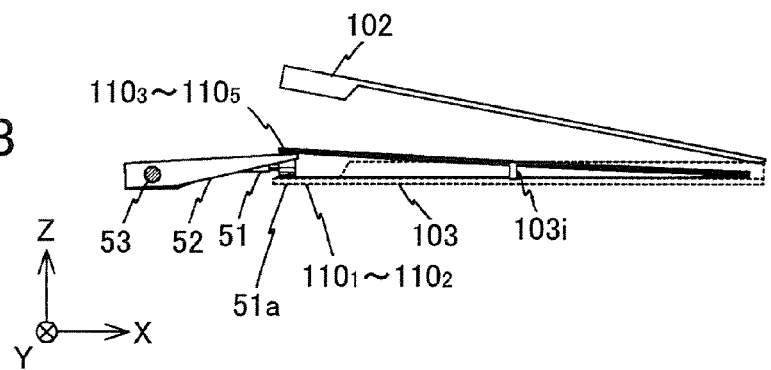

Next, as shown in FIG. 13B, the control device 11 turns the second arm 52 to lift the tag $TG_3$ and thereby separates the sheets $110_3$ through $110_5$ from the sheets $110_1$ and $110_2$ to expose the optical disk $90_2$ on the sheet $110_2$.

Figure 13C:
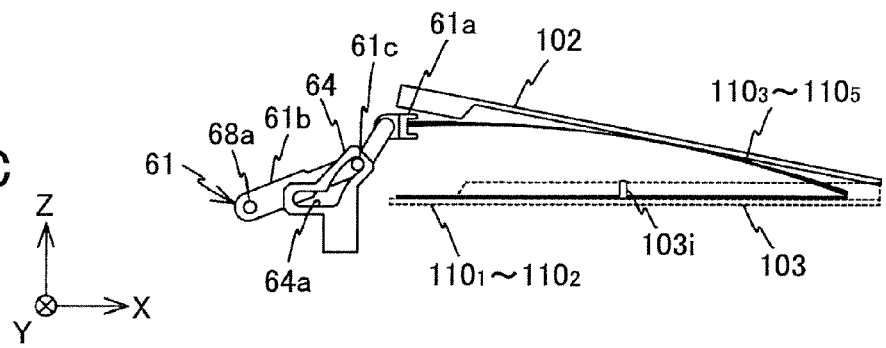

Then, as shown in FIG. 13C, the control device 11 drives the clamp arm 61 to lift the sheets $110_3$ through $110_5$ further and thereby secures a space above the optical disk $90_2$ for the second swing arm 300 to enter.

Figure 14A:
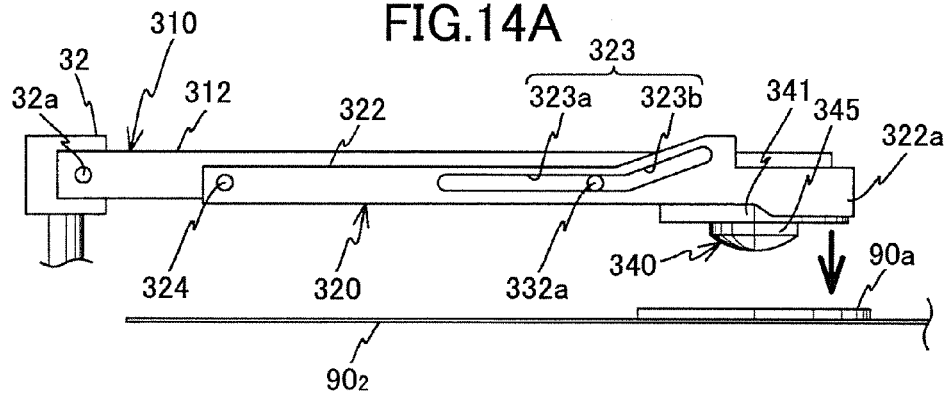
FIGS. 14A through 14C are drawings used to describe an operation of the second swing arm 300.

After the above step, the control device 11 causes the motor 37 and the drive unit 35 of the disk carrier device 30 to drive the second swing arm 300 (hereafter, this step is simply described as "to drive the second swing arm 300") and thereby moves the clamper 340 to a position above the optical disk $90_2$ as shown in FIG. 14A. Then, the control device 11 moves the second swing arm 300 downward as indicated by an arrow in FIG. 14A. As a result, the protrusion 345 of the clamper 340 is inserted into the circular opening of the disk hub 90a affixed to the optical disk $90_2$ and the disk hub 90a is attracted to and held by the attracting part 341.

Figure 14B:
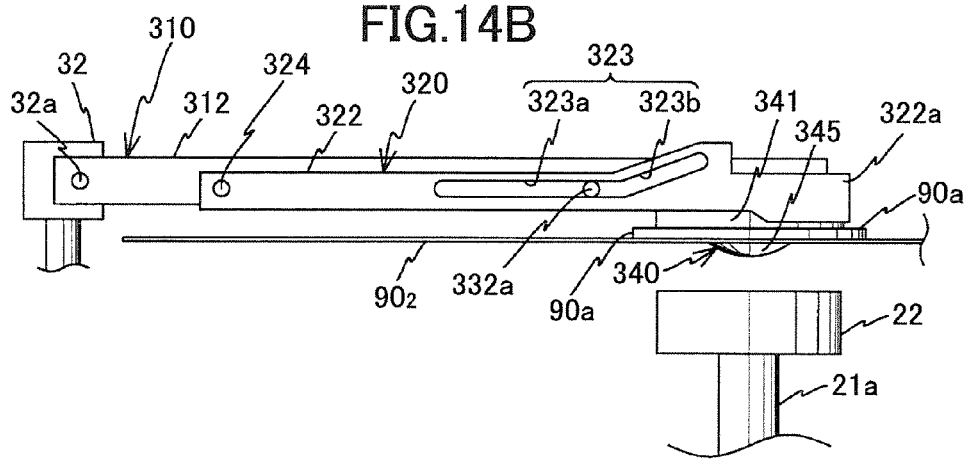

Next, the control device 11 drives the second swing arm 300 and, as shown in FIG. 14B, carries the optical disk $90_2$ held by the clamper 340 to a position above the disk chuck 22 of the disk rotating device 20.

Figure 14C:
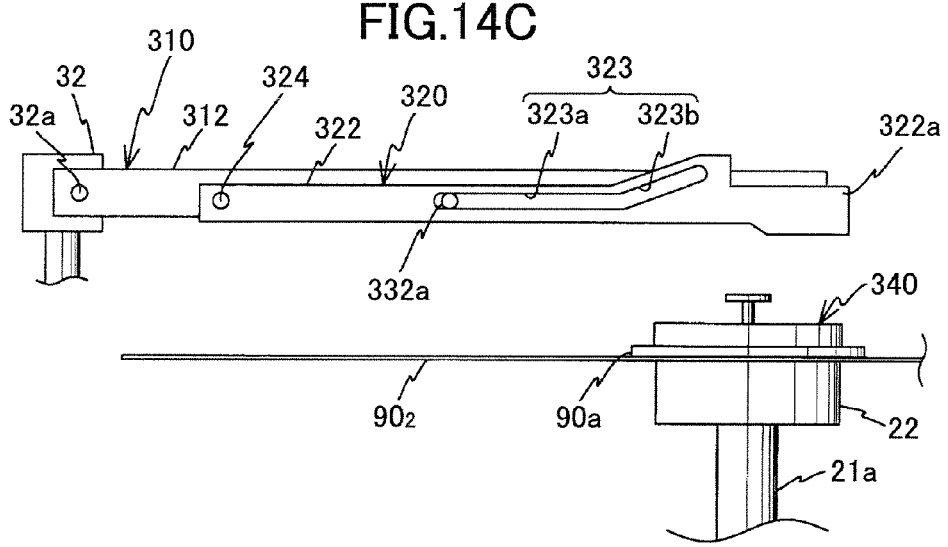

Then, the control device 11 slides the holding part 330 in the −X direction. As a result, the clamper 340 held by the sliding plate 331 falls onto the top surface of the disk chuck 22 as shown in FIG. 14C. The protrusion 345 of the clamper 340 fits into the circular recess in the top surface of the disk chuck 22 and the clamper 340 magnetically adheres to the disk chuck 22. While the clamper 340 is held by the holding part 330, the magnetic force of the attracting part 341 is exerted on the sliding plate 331 of the holding part 330. However, when the holding part 330 is slid in the −X direction, the influence of the magnetic force of the attracting part 341 on the sliding plate 331 is reduced and therefore the clamper 340 falls under its own weight. In FIG. 14C, a substantial distance is provided between the disk chuck 22 and the second swing arm 300 for descriptive purposes. However, in an actual case, the disk chuck 22 and the second swing arm 300 are positioned as close as possible to prevent the clamper 340 from falling off the disk chuck 22. As another method, the holding part 330 may be slid in the −X direction after placing the clamper 340 on the disk chuck 22.

In the next step, the control device 11 retracts the second swing arm 300 to an upper position and drives the disk rotating device 20 to write or read information on the optical disk $90_2$.

Figure 15A:
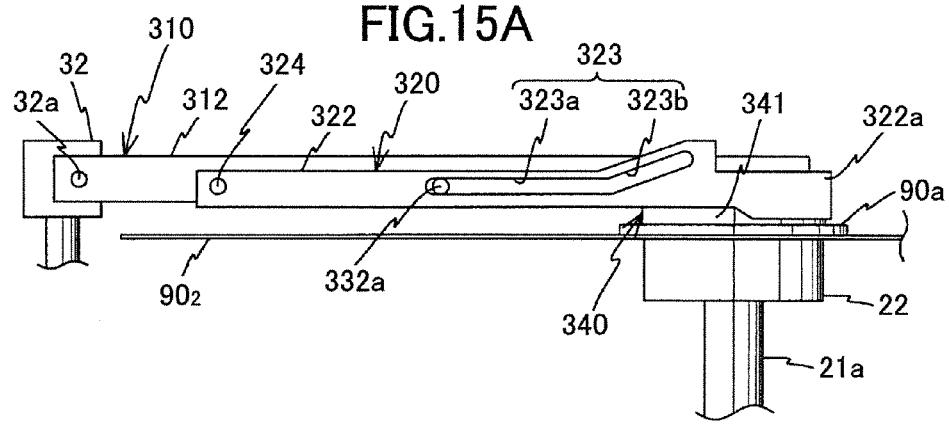
FIGS. 15A through 15C are drawings used to describe an operation of the second swing arm 300.
Figure 15B:
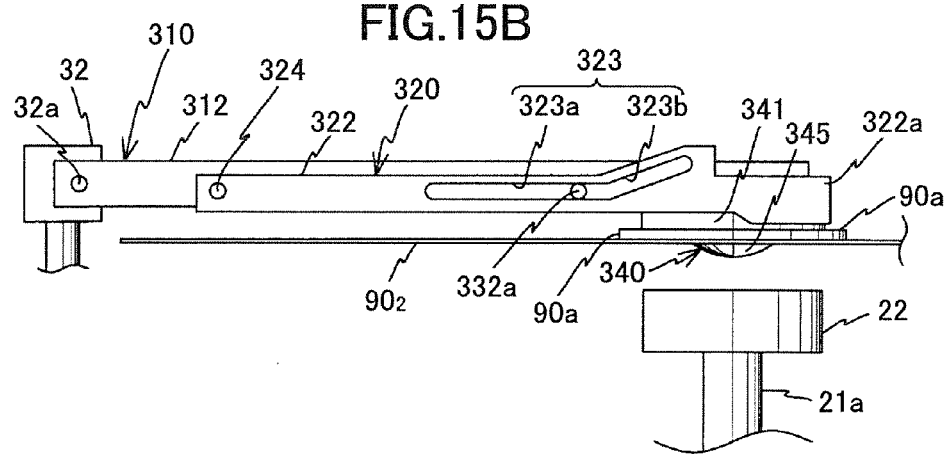

After reading or writing information on the optical disk $90_2$, as shown in FIG. 15A, the control device 11 moves the second swing arm 300 downward until the protrusion 342 of the clamper 340 fits in the round hole 313 in the arm body 310 and then slides the holding part 330 in the +X direction to hold the clamper 340. Then, the control device 11 moves the second swing arm 300 upward. As a result, as shown in FIG. 15B, the optical disk $90_2$ held by the clamper 340 is moved upward and becomes ready to be carried.

Figure 15C:
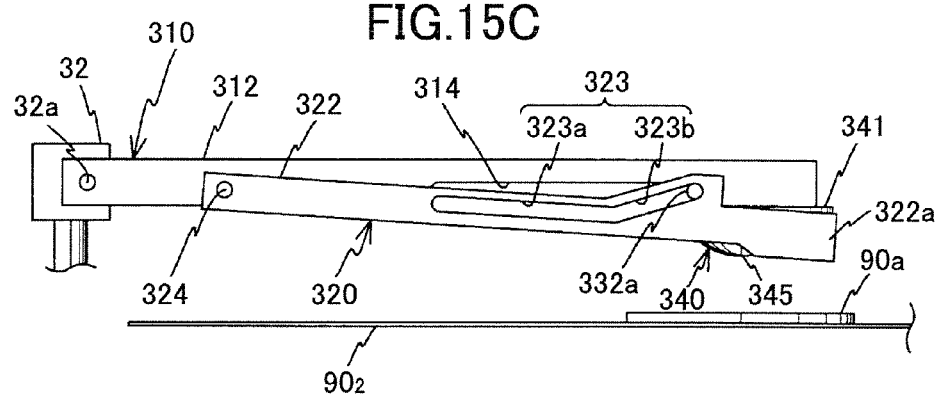

The control device 11 drives the second swing arm 300, thereby carries the optical disk $90_2$ to a position above the sheet $110_2$ of the disk cartridge 100, and then slides the holding part 330 further in the +X direction. Accordingly, the disk hub 90a is pushed downward by the separating arms 322a and is thereby separated from the clamper 340 as shown in FIG. 15C. As a result, the optical disk $90_2$ is placed on the sheet $110_2$.

After carrying the optical disk $90_2$ from the disk rotating device 20 to the disk cartridge 100, the control device 11 performs the disk cartridge opening steps described above in the reverse order to close the disk cartridge 100.

As described above, the disk carrier device 30 of this embodiment includes the clamper 340 detachably held by the holding part 330 that is slidably attached to the arm body 310. When the optical disk 90 is carried between the disk cartridge 100 and the disk rotating device 20, the optical disk 90 is held on the clamper 340 by attracting the disk hub 90a by the magnetic force of the permanent magnet of the attracting part 341. This configuration does not require supplying energy such as electric power to hold the optical disk 90 and therefore makes it possible to efficiently carry the optical disk 90. Especially, when the carrying distance or the carrying time of the optical disk 90 is long or when there is waiting time in a disk carrying process during which the optical disk 90 has to be held on the clamper 340, the above configuration makes it possible to greatly reduce power consumption compared with a configuration using an electromagnet.

In the above embodiment, the optical disk 90 is mounted on the disk rotating device 20 by sliding the holding part 330 in the −X direction that is orthogonal to the direction of magnetic force of the clamper 340 and thereby releasing the clamper 340 from the arm body 310. This configuration does not require a large amount of power to drive the holding part 330 and therefore makes it possible to reduce power consumption of the drive mechanism 350. Also, with this configuration, since the sliding plate 331 and the clamper 340 engage mechanically, the clamper 340 does not fall off the arm body 310 even when sudden impact is applied.

In the above embodiment, the optical disk 90 is placed in the disk cartridge 100 by sliding the holding part 330 in the +X direction that is orthogonal to the direction of magnetic force of the clamper 340 and thereby separating the disk hub 90a from the clamper 340. This configuration does not require a large amount of power to drive the holding part 330 and therefore makes it possible to reduce power consumption of the drive mechanism 350.

In the above embodiment, a material that is attracted by a magnet, such as a ferritic stainless steel, is used for the sliding plate 331 of the disk carrier device 30. Alternatively, a material that is not attracted by a magnet may be used for the sliding plate 331. Even in this case, it is possible to stably carry the optical disk 90 by holding the clamper 340 with the sliding plate 331 of the holding part 330.

Figure 16A:
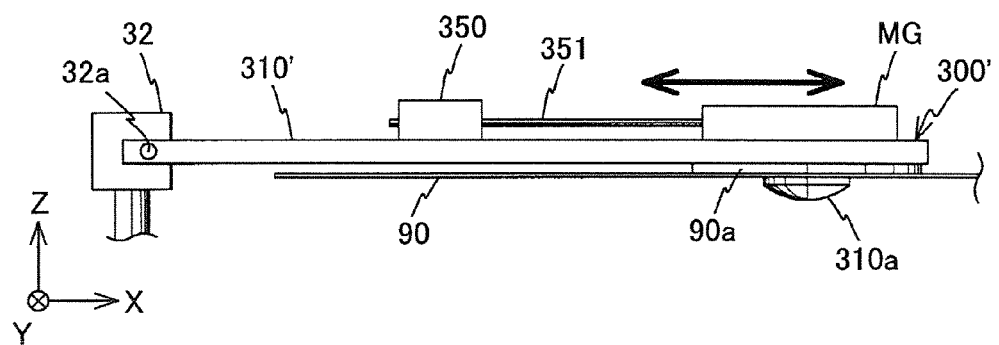
FIGS. 16A and 16B are drawings used to describe a configuration and an operation of a second swing arm 300' that is a variation of the second swing arm 300.
Figure 16B:
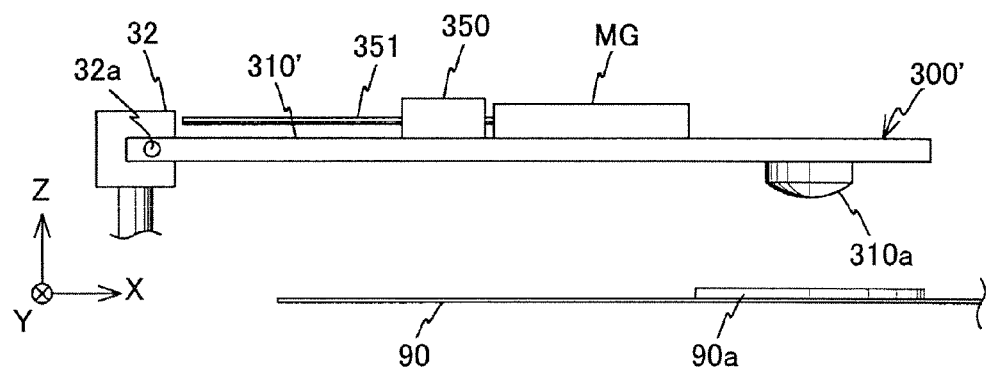

The holding part 330 for holding the clamper 340 may be replaced with a magnet unit MG that holds the disk hub 90a by magnetic force. An exemplary configuration of a second swing arm 300', which is a variation of the second swing arm 300, is described below with reference to FIGS. 16A and 16B. In FIGS. 16A and 16B, the same reference numbers are used for parts corresponding to those of the second swing arm 300, and descriptions of those parts are omitted or simplified.

<Variation>

As shown in FIGS. 16A and 16B, the second swing arm 300' includes an arm body (position-determining part) 310' shaped like a rectangular plate and extending in the X axis direction. The arm body 310' has a protrusion 310a formed near the +X end and protruding downward from the lower surface. Also, a magnet unit MG (attracting unit) is disposed on the upper surface of the arm body 310'. The magnet unit MG is moved in the X axis direction by the drive mechanism 350 via the drive shaft 351.

When the magnet unit MG is moved to a position above the protrusion 310a of the arm body 310' and the protrusion 310a is inserted into the circular opening of the disk hub 90a affixed to the optical disk 90, the disk hub 90a is attracted and held by the second swing arm 300' as shown in FIG. 16A. When the magnet unit MG is moved from a position shown in FIG. 16A to a position shown in FIG. 16B, the disk hub 90a is released and therefore the optical disk 90 is released.

The disk carrier device 30 including the second swing arm 300' instead of the second swing arm 300 can also stably carry the optical disk 90 between the disk cartridge 100 and the disk rotating device 20. This configuration also does not require supplying energy such as electric power to hold the optical disk 90 and therefore makes it possible to efficiently carry the optical disk 90. Especially, when the carrying distance or the carrying time of the optical disk 90 is long or when there is waiting time in a disk carrying process during which the optical disk 90 has to be held on the second swing arm 300', this configuration makes it possible to greatly reduce power consumption compared with a configuration using an electromagnet.

The optical disk drive 10 of an embodiment of the present invention includes the disk carrier device 30 as described above. This configuration makes it possible to reduce power consumption needed to carry the optical disk 90 between the disk cartridge 100 and the disk rotating device 20 and thereby to improve the energy efficiency of the optical disk drive 10.

The optical disk 90 may be any type of optical disk as long as it is flexible. For example, optical disks using light of various wavelengths, such as a digital versatile disc (DVD), a compact disc (CD), and a next-generation recording medium using light with a wavelength of about 405 nm, may be used as the optical disk 90.

In the disk carrier device 30 of the above embodiment, the first swing arm 34 and the second swing arm 300 are driven by their respective drive mechanisms. Alternatively, the first swing arm 34 and the second swing arm 300 may be linked by a planetary gear mechanism so that they can be driven by one drive mechanism.

In the above embodiment, a ferritic stainless steel is used for the disk hub 90a of the optical disk 90. Alternatively, any other metal plate made of a magnetic material or a magnetic sheet on which a magnetic material is applied may be used in place of a ferritic stainless steel.

As described above, a disk carrier device of an embodiment of the present invention can efficiently carry an optical disk, and an optical disk drive of an embodiment of the present invention can efficiently record, reproduce, and erase information on an optical disk.

An embodiment of the present invention provides a disk carrier device that can efficiently carry a flexible optical disk.

Another embodiment of the present invention provides an optical disk drive having a lower risk of dropping a disk being carried and having improved energy efficiency.

An aspect of the present invention provides a disk carrier device for carrying an optical disk having a plate in the center thereof, which plate is capable of being attracted by magnetic force. The disk carrier device comprises an attracting unit including a permanent magnet that attracts and thereby holds the plate; and a holding mechanism configured to detachably hold the attracting unit.

The disk carrier device carries an optical disk by attracting and holding the plate by the attracting unit held by the holding mechanism and releases the optical disk by detaching the attracting unit from the holding mechanism. This configuration makes it possible to hold an optical disk without a supply of exciting current, to reduce power consumption during an optical disk carrying process, and thereby to improve the efficiency of carrying an optical disk.

Another aspect of the present invention provides a disk carrier device for carrying an optical disk having a plate in the center thereof, which plate is capable of being attracted by magnetic force. The disk carrier device comprises a position-determining part configured to determine a position of the plate; an attracting unit including a permanent magnet that attracts and holds the plate via a part of the position-determining part; and a drive mechanism configured to move the attracting unit back and forth between a position where the attracting unit does not exert magnetic force on the plate and a position where the attracting unit exerts magnetic force on the plate.

With the disk carrier device, the position of the plate is determined by the position-determining part, and the plate is attracted and held by the attracting unit moved by the drive mechanism into a position where the attracting unit exerts magnetic force on the plate. When the attracting unit is moved by the drive mechanism to a position where the attracting unit does not exert magnetic force on the plate, the optical disk is released from the disk carrier device. The drive mechanism moves the attracting unit in a direction orthogonal to the direction of the magnetic force. This configuration makes it possible to hold an optical disk with a small magnetic force. Aspects of the present invention make it possible to use a permanent magnet that does not require an exciting current to attract and hold an optical disk. Accordingly, aspects of the present invention make it possible to reduce power consumption and to improve efficiency in carrying an optical disk.

The present invention is not limited to the specifically disclosed embodiments, and variations and modifications may be made without departing from the scope of the present invention.

The present application is based on Japanese Priority Application No. 2006-283028, filed on Oct. 17, 2006, the entire contents of which are hereby incorporated herein by reference.

What is claimed is:

1. A disk carrier device for carrying an optical disk having a plate in the center thereof, which plate is capable of being attracted by a magnetic force, comprising:
    an attracting unit including a permanent magnet that attracts and thereby holds the plate, wherein the attracting unit does not consume power; and
    a holding mechanism configured to detachably hold the attracting unit;
    wherein the attracting unit comprises
    an attracting part shaped like a circular plate;
    a permanent magnet that attracts a disk hub, affixed to the optical disk, by magnetic force;
    a circular protrusion in the center of an upper surface of the attracting part; and
    a hook connected to the circular protrusion via a connecting shaft.

2. The disk carrier device as claimed in claim 1, wherein a height of the circular protrusion is substantially the same as a thickness of a base.

3. A method of operating a disk carrier device, comprising the steps of:
    opening a lid of a disk cartridge;
    moving a slider so that a roller of a first arm is positioned above a first tag and a tip of a second arm is position below a second tag;
    turning the second arm to lift the second tag;
    separating first, second, and third sheets from fourth and fifth sheets to expose an optical disk on the fifth sheet;
    driving a clamp arm to lift first, second, and third sheets to secure a space above the optical disk for a second arm to enter;
    driving the second arm to move a damper to a position above the optical disk;
    moving the second arm so that a protrusion of the damper is inserted into a circular opening of a disk hub affixed to the optical disk, wherein the disk hub is attracted to and held by an attracting part;
    driving the second arm to carry the optical disk to a position above a disk chuck of a disk rotating device;
    sliding a holding part in a −X direction;
    retracting the second arm to an upper position;
    driving the disk rotating device to write or read information on the optical disk;
    moving the second arm downward and upward;
    driving the second arm to a position above the fourth sheet; and
    sliding the holding part in a +X direction.

4. The method of claim 3, wherein the steps are performed in reverse order to close the disk cartridge.

5. The method of claim 3, wherein the attracting part does not consume power.

6. The method of claim 3, wherein the damper magnetically adheres to the disk chuck.

7. The method of claim 3, wherein a stabilizing plate balances a restoring force and a repulsive force to reduce an out-of-plane motion of the optical disk in the direction of its rotational axis.

8. A method of manufacturing a disk carrier device comprising:
    an attracting unit including a permanent magnet that attracts and thereby holds the plate, wherein the attracting unit does not consume power; and
    a holding mechanism configured to detachably hold the attracting unit.

* * * * *